United States Patent
Peled et al.

(10) Patent No.: US 11,824,956 B2
(45) Date of Patent: *Nov. 21, 2023

(54) PRE-RENDERING OF APPLICATION USER-INTERFACES IN USER DEVICES USING OFF-LINE PRE-RENDER MODE

(71) Applicant: TENSERA NETWORKS LTD., Hod Hasharon (IL)

(72) Inventors: Roee Peled, Ramat Gan (IL); Amit Wix, Raanana (IL)

(73) Assignee: TENSERA NETWORKS LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/624,357

(22) PCT Filed: Jul. 26, 2020

(86) PCT No.: PCT/IB2020/057046
§ 371 (c)(1),
(2) Date: Jan. 3, 2022

(87) PCT Pub. No.: WO2021/019415
PCT Pub. Date: Feb. 4, 2021

(65) Prior Publication Data
US 2022/0358177 A1     Nov. 10, 2022

Related U.S. Application Data

(60) Provisional application No. 62/880,674, filed on Jul. 31, 2019, provisional application No. 62/880,092, filed on Jul. 30, 2019.

(51) Int. Cl.
*H04L 67/60*     (2022.01)
*H04L 67/00*     (2022.01)
(Continued)

(52) U.S. Cl.
CPC .............. *H04L 67/60* (2022.05); *G06F 9/451* (2018.02); *G06F 9/543* (2013.01);
(Continued)

(58) Field of Classification Search
None
See application file for complete search history.

(56) References Cited

U.S. PATENT DOCUMENTS 6,807,570 B1   10/2004   Allen et al.
8,140,997 B2   3/2012    Nemoto
(Continued)

FOREIGN PATENT DOCUMENTS

CN   102063302 A   5/2011
CN   108681475 A   10/2018
(Continued)

OTHER PUBLICATIONS

U.S. Appl. No. 17/363,039 Office Action dated May 11, 2022.
(Continued)

*Primary Examiner* — Syed A Roni
(74) *Attorney, Agent, or Firm* — KLIGLER & ASSOCIATES PATENT ATTORNEYS LTD (57) ABSTRACT

A method includes, in a user device (24) that is configured to communicate over a network (32), preloading an application (26) in a background mode in which content presented by the application is hidden from a user of tire user device. At least part of the content presented by the application is pre-rendered in an off-line pre-render mode in which fetching of content over the network to the user device is not permitted. In response to an action by the user that requests to access the application, a switch is made to presenting at least the pre-rendered content to the user in a foreground mode.

28 Claims, 4 Drawing Sheets

(51) Int. Cl.
  *G06F 16/957* (2019.01)
  *G06F 12/0862* (2016.01)
  *G06F 9/451* (2018.01)
  *G06F 9/54* (2006.01)

(52) U.S. Cl.
  CPC ...... *G06F 12/0862* (2013.01); *G06F 16/9574* (2019.01); *H04L 67/34* (2013.01)

(56) References Cited

U.S. PATENT DOCUMENTS

| | | |
|---|---|---|
| 8,250,228 B1 | 8/2012 | Johansson |
| 8,341,245 B1 | 12/2012 | Roskind et al. |
| 8,418,190 B2 | 4/2013 | Rivard et al. |
| 8,881,033 B2 | 11/2014 | Mentchoukov et al. |
| 9,385,914 B1 | 7/2016 | Britto et al. |
| 9,513,888 B1 | 12/2016 | Fultz et al. |
| 9,565,233 B1 | 2/2017 | Ozuysal et al. |
| 9,959,506 B1 | 5/2018 | Karppanen |
| 9,961,159 B2 | 5/2018 | Yellin et al. |
| 9,979,796 B1 | 5/2018 | Yellin et al. |
| 10,013,497 B1 | 7/2018 | Boodman |
| 10,432,748 B2 | 10/2019 | Yellin et al. |
| 10,459,887 B1 | 10/2019 | Dvortsov et al. |
| 10,613,735 B1 | 4/2020 | Karpe et al. |
| 11,095,743 B2 | 8/2021 | Yellin et al. |
| 11,128,729 B2 | 9/2021 | Yellin et al. |
| 2003/0101234 A1 | 5/2003 | McBrearty et al. |
| 2003/0195940 A1 | 10/2003 | Basu et al. |
| 2003/0220984 A1 | 11/2003 | Jones et al. |
| 2004/0030882 A1* | 2/2004 | Forman .............. G06F 9/445 713/100 |
| 2005/0066283 A1 | 3/2005 | Kanamaru |
| 2005/0132302 A1 | 6/2005 | Cina |
| 2006/0026636 A1 | 2/2006 | Stark et al. |
| 2006/0101514 A1 | 5/2006 | Milener et al. |
| 2008/0307339 A1 | 12/2008 | Boro et al. |
| 2009/0006671 A1 | 1/2009 | Batson et al. |
| 2009/0037393 A1 | 2/2009 | Fredricksen et al. |
| 2010/0058248 A1 | 3/2010 | Park |
| 2011/0211813 A1 | 9/2011 | Marks |
| 2011/0249668 A1 | 10/2011 | Van Milligan et al. |
| 2012/0023226 A1 | 1/2012 | Petersen et al. |
| 2012/0023506 A1 | 1/2012 | Maeckel et al. |
| 2012/0084343 A1 | 4/2012 | Mir et al. |
| 2012/0159393 A1 | 6/2012 | Sethi |
| 2012/0167122 A1 | 6/2012 | Koskimies |
| 2012/0278432 A1 | 11/2012 | Luna |
| 2012/0317188 A1 | 12/2012 | Fredricksen et al. |
| 2012/0324481 A1 | 12/2012 | Xia et al. |
| 2013/0019159 A1 | 1/2013 | Civelli et al. |
| 2013/0031204 A1 | 1/2013 | Graham et al. |
| 2013/0173513 A1 | 7/2013 | Chu et al. |
| 2013/0185633 A1 | 7/2013 | Bunker et al. |
| 2013/0263023 A1 | 10/2013 | Goodwin et al. |
| 2013/0275899 A1 | 10/2013 | Schubert et al. |
| 2013/0283283 A1 | 10/2013 | Wang et al. |
| 2014/0053057 A1 | 2/2014 | Reshadi et al. |
| 2014/0094163 A1 | 4/2014 | Widdowson et al. |
| 2014/0162793 A1 | 6/2014 | Quan et al. |
| 2014/0201673 A1 | 7/2014 | Dunn |
| 2014/0280485 A1 | 9/2014 | A Hummaida et al. |
| 2014/0359442 A1 | 12/2014 | Lin |
| 2014/0372356 A1 | 12/2014 | Bilal et al. |
| 2014/0373032 A1 | 12/2014 | Merry et al. |
| 2015/0026415 A1 | 1/2015 | Clausen et al. |
| 2015/0045921 A1 | 2/2015 | Stewart et al. |
| 2015/0046519 A1 | 2/2015 | Shukla et al. |
| 2015/0193395 A1 | 7/2015 | Nicolaou et al. |
| 2015/0207852 A1 | 7/2015 | Boodman et al. |
| 2015/0208205 A1 | 7/2015 | Chan et al. |
| 2015/0215816 A1 | 7/2015 | Abou-Elkheir et al. |
| 2015/0281147 A1 | 10/2015 | Wang et al. |
| 2015/0347615 A1 | 12/2015 | McGushion et al. |
| 2015/0371142 A1 | 12/2015 | Jain |
| 2015/0372933 A1 | 12/2015 | Cai et al. |
| 2016/0057167 A1 | 2/2016 | Bach |
| 2016/0085583 A1 | 3/2016 | Goodson |
| 2016/0103608 A1 | 4/2016 | Nukala et al. |
| 2016/0227464 A1 | 8/2016 | Senarath et al. |
| 2016/0259656 A1 | 9/2016 | Sumner et al. |
| 2016/0344679 A1 | 11/2016 | Lane et al. |
| 2017/0011681 A1 | 1/2017 | Bathiche et al. |
| 2017/0031869 A1 | 2/2017 | Franczyk et al. |
| 2017/0046235 A1 | 2/2017 | Straub et al. |
| 2017/0111465 A1* | 4/2017 | Yellin .............. H04L 67/568 |
| 2017/0126833 A1 | 5/2017 | DeLuca et al. |
| 2017/0278477 A1 | 9/2017 | Jeong et al. |
| 2017/0293465 A1 | 10/2017 | Kotteri et al. |
| 2017/0371685 A1 | 12/2017 | Tanaka et al. |
| 2018/0129537 A1 | 5/2018 | Kurtzman et al. |
| 2018/0212741 A1 | 7/2018 | Lindoff et al. |
| 2018/0241837 A1 | 8/2018 | Yellin et al. |
| 2018/0246862 A1 | 8/2018 | Burkard et al. |
| 2018/0293087 A1 | 10/2018 | Lee et al. |
| 2018/0364890 A1 | 12/2018 | Lee et al. |
| 2019/0065144 A1 | 2/2019 | Sumner et al. |
| 2019/0087205 A1 | 3/2019 | Guday |
| 2019/0188012 A1 | 6/2019 | Chen et al. |
| 2019/0188013 A1 | 6/2019 | Krishna et al. |
| 2019/0196849 A1 | 6/2019 | Chen et al. |
| 2019/0205159 A1 | 7/2019 | Wen et al. |
| 2019/0221224 A1 | 7/2019 | Heitkamp et al. |
| 2019/0361581 A1 | 11/2019 | Wang et al. |
| 2019/0370022 A1 | 12/2019 | Han et al. |
| 2020/0159597 A1 | 5/2020 | Yellin et al. |
| 2020/0159816 A1 | 5/2020 | Bostrom et al. |
| 2020/0183822 A1 | 6/2020 | Bates |
| 2020/0225818 A1 | 7/2020 | Ozuysal |
| 2020/0336514 A1 | 10/2020 | Momchilov et al. |
| 2020/0342338 A1 | 10/2020 | Huang |
| 2020/0401418 A1 | 12/2020 | Regev et al. |
| 2021/0103447 A1 | 4/2021 | Wei et al. |
| 2021/0224085 A1 | 7/2021 | Moore |
| 2021/0304096 A1 | 9/2021 | Kirubakaran et al. |
| 2021/0323908 A1 | 10/2021 | Yellin et al. |
| 2021/0329088 A1 | 10/2021 | Yellin et al. |
| 2021/0329089 A1 | 10/2021 | Yellin et al. |
| 2021/0329090 A1 | 10/2021 | Yellin et al. |
| 2021/0329091 A1 | 10/2021 | Yellin et al. |
| 2021/0385295 A1 | 12/2021 | Yellin et al. |
| 2022/0413695 A1 | 12/2022 | Guan et al. |
| 2023/0018798 A1 | 1/2023 | Coffman et al. |

FOREIGN PATENT DOCUMENTS

| | | |
|---|---|---|
| CN | 108920156 A | 11/2018 |
| KR | 20160116910 A | 10/2016 |
| WO | 2015169188 A1 | 11/2015 |
| WO | 2018055506 A1 | 3/2018 |
| WO | 2018234967 A1 | 12/2018 |
| WO | 2019082042 A1 | 5/2021 |
| WO | 2021161174 A1 | 8/2021 |

OTHER PUBLICATIONS

International Application # PCT/IB2022/050581 Search Report dated May 25, 2022.
International Application # PCT/IB2022/051531 Search Report dated Jun. 19, 2022.
U.S. Appl. No. 17/403,908 Office Action dated Jul. 21, 2022.
U.S. Appl. No. 17/363,047 Office Action dated Jul. 26, 2022.
International Application # PCT/IB2020/057046 Search Report dated Nov. 17, 2020.
U.S. Appl. No. 17/363,047 Office Action dated Feb. 11, 2022.
U.S. Appl. No. 17/363,036 Office Action dated Mar. 4, 2022.
Peled et al., U.S. Appl. No. 17/567,183, filed Jan. 3, 2022.
Peled et al., U.S. Appl. No. 17/567,187, filed Jan. 3, 2022.
U.S. Appl. No. 17/363,058 Office Action dated Mar. 21, 2022.
"Understand the Activity Lifecycle," Android Developers, pp. 1-21, last updated Oct. 27, 2021, as downloaded from https://developer.android.com/guide/components/activities/activity-lifecycle.

(56) References Cited

OTHER PUBLICATIONS

International Application # PCT/IB2021/060789 Search Report dated Mar. 21, 2022.
International Application # PCT/IB2021/061606 Search Report dated Apr. 7, 2022.
International Application # PCT/IB2021/060789 filed Nov. 21, 2021.
International Application # PCT/IB2021/061606 filed Dec. 13, 2021.
International Application # PCT/IB2022/050581 filed Jan. 24, 2022.
International Application # PCT/IB2022/051531 filed Feb. 22, 2022.
U.S. Appl. No. 17/739,122 Office Action dated Sep. 21, 2022.
U.S. Appl. No. 17/363,047 Office Action dated Nov. 1, 2022.
U.S. Appl. No. 17/739,122 Office Action dated Feb. 1, 2023.
EP Application # 20845959.4 Search Report dated Feb. 2, 2023.
U.S. Appl. No. 17/567,183 Office Action dated Dec. 30, 2022.
U.S. Appl. No. 17/567,187 Office Action dated Mar. 27, 2023.
Lee et al., "CAS: Context-Aware Background Application Scheduling in Interactive Mobile Systems," IEEE Journal on Selected Areas in Communications, vol. 35, No. 5, pp. 1013-1029, May 2017.
U.S. Appl. No. 16/968,652 Office Action dated Jul. 10, 2023.
U.S. Appl. No. 17/849,644 Office Action dated Oct. 5, 2023.

\* cited by examiner

PRE-RENDERING OF APPLICATION USER-INTERFACES IN USER DEVICES USING OFF-LINE PRE-RENDER MODE

CROSS-REFERENCE TO RELATED APPLICATIONS

This application is U.S. national-phase of PCT application PCT/IB2020/057046, filed Jul. 26, 2020, which claims the benefit of U.S. Provisional Patent Application 62/880,092, filed Jul. 30, 2019, and U.S. Provisional Patent Application 62/880,674, filed Jul. 31, 2019. The disclosures of these related applications are incorporated herein by reference.

FIELD OF THE INVENTION

The present invention relates generally to communication systems, and particularly to pre-rendering of content in user devices.

BACKGROUND OF THE INVENTION

In applications ("apps") that run on user devices such as smartphones, one of the major factors affecting user experience is the latency of the User Interface (UI). Various techniques have been proposed for reducing latency and providing a more responsive UI. Some techniques involve prefetching of content. Other techniques involve background preloading of apps. Yet other techniques involve pre-rendering of an app's UI. Techniques of this sort are described, for example, in PCT International Publication WO 2018/055506, entitled "An Optimized CDN for the Wireless Last Mile," which is incorporated herein by reference.

SUMMARY OF THE INVENTION

An embodiment of the present invention that is described herein provides a method including, in a user device that is configured to communicate over a network, preloading an application in a background mode in which content presented by the application is hidden from a user of the user device. At least part of the content presented by the application is pre-rendered in an off-line pre-render mode in which fetching of content over the network to the user device is not permitted. In response to an action by the user that requests to access the application, a switch is made to presenting at least the pre-rendered content to the user in a foreground mode.

In some embodiments, pre-rendering in the off-line pre-render mode includes declining network-related requests from the application. Declining the network-related requests may include responding to the network-related requests from the application with a response indicating the network is unavailable.

In an embodiment, pre-rendering in the off-line pre-render mode includes rendering at least part of the content from a local cache in the user device. In another embodiment, pre-rendering in the off-line pre-render mode includes notifying the application that pre-rendering is performed in accordance with the off-line pre-render mode. In yet another embodiment, pre-rendering in the off-line pre-render mode includes pre-rendering a placeholder item in place of an actual content item that requires fetching over the network.

In still another embodiment, pre-rendering in the off-line pre-render mode includes penalizing the application for requesting to fetch a content item over the network. In an example embodiment, pre-rendering in the off-line pre-render mode includes receiving in the application, via an Application Programming Interface (API), an indication that pre-rendering is performed in accordance with the off-line pre-render mode, and in response running program code that pre-renders the content in accordance with the off-line pre-render mode.

In a disclosed embodiment, switching to the foreground mode includes refreshing at least some of the content over the network. In another embodiment, pre-rendering in the off-line pre-render mode is performed in response to an acknowledgement from the application, indicating that the application supports the off-line pre-render mode.

In some embodiments, preloading the application includes choosing, based on a criterion, whether to pre-render the content in accordance with the off-line pre-render mode, or in accordance with an on-line pre-render mode in which it is permitted to fetch content over the network to the user device. In an embodiment, pre-rendering in the on-line pre-render mode includes receiving in the application, via an Application Programming interface (API), an indication that pre-rendering is performed in accordance with the on-line pre-render mode, and ice response running program code that pre-renders the content in accordance with the on-line pre-render mode. In another embodiment, choosing the on-line pre-render mode is performed in response to an acknowledgement from the application, indicating that the application supports the on-line pre-render mode. In a disclosed embodiment, the criterion depends on at least one factor selected from (i) a usage pattern of the application, (ii) a condition of the user device, and (iii) a condition of the network.

There is additionally provided, in accordance with an embodiment of the present invention, a method including issuing, by an application running in a user device, a request to fetch over the network content that includes multiple content items. The request is received by a software agent running in the user device and, in response to the request, a chain of fetch operations is executed for fetching the requested content. Each of the fetch operations in the chain includes (i) receiving from the application an identification of one or more additional content items identified by the application within a content item fetched in a preceding fetch operation in the chain, (ii) evaluating a criterion, and (iii) deciding, depending on the criterion, whether or not to fetch the one or more additional content items.

In some embodiments, the method includes pre-rendering one or more of the content items in a background mode. In some embodiments, issuing the request includes prefetching the content, not in response to a user accessing the content.

There is also provided, in accordance with an embodiment of the present invention, a method including, in a user device, which is configured to execute User Interface (UI) tasks that process one or more UI displays presented to a user, assigning to each UI task among the UI tasks (i) a priority selected from at least a Foreground (FG) priority and a Background (BG) priority, and (ii) an association with a UI display being processed by the UI task. The UI tasks are scheduled for execution in accordance with a schedule that (i) gives precedence to the UI tasks having the FG priority over the UI tasks having the BG priority, and (ii) for any UI display, retains in-order execution of the UI tasks associated with the UI display. The UI tasks are executed in accordance with the schedule.

In some embodiments, one or more of the UI tasks having the BG priority include pre-rendering tasks. In an embodiment, at a given time, the UI tasks include both (i) one or more UI tasks having the BG priority, and (ii) one or more UI tasks having the FG priority that relate to user actions. In a disclosed embodiment, executing the UI tasks is performed by a single UI thread per user application.

In some embodiments, assigning the priority includes, in response to addition of a new UI task having the FG priority, identifying one or more UI tasks that (i) are associated with a same UI display as the new UI task and (ii) have the BG priority, and promoting the identified UI tasks to the FG priority. In an example embodiment, scheduling the UI tasks includes scheduling the promoted UI tasks to be executed before the new UI task. In another embodiment, scheduling the UI tasks includes retaining an original order of execution among the promoted UI tasks. In yet another embodiment, scheduling the UI tasks includes permitting out-of-order execution of UI tasks associated with different UI displays.

There is further provided, in accordance with an embodiment of the present invention, a user device including an interface for communicating over a network, and a processor. The processor is configured to preload an application in a background mode in which content presented by the application is hidden from a user of the user device, to pre-render at least part of the content presented by the application in an off-line pre-render mode in which fetching of content over the network to the user device is not permitted, and, in response to an action by the user that requests to access the application, to switch to presenting at least the pre-rendered content to the user in a foreground mode.

There is also provided, in accordance with an embodiment of the present invention, a user device including an interface for communicating over a network, and a processor. The processor is configured to issue, by an application running on the processor, a request to fetch over the network content that includes multiple content items, to receive the request by a software agent running on the processor and, in response to the request, execute a chain of fetch operations for fetching the requested content, wherein each of the fetch operations in the chain comprises (i) receiving from the application an identification of one or more additional content items identified by the application within a content item fetched in a preceding fetch operation in the chain, (ii) evaluating a criterion, and (iii) deciding, depending on the criterion, whether or not to fetch the one or more additional content items.

There is additionally provided, in accordance with an embodiment of the present invention, a user device including an interface for communicating over a network, and a processor. The processor is configured to assign, to each User Interface (UI) task from among multiple UI tasks that process one or more UI displays presented to a user, (i) a priority selected from at least a Foreground (FG) priority and a Background (BG) priority, and (ii) an association with a UI display being processed by the UI task, to schedule the UI tasks for execution in accordance with a schedule that (i) gives precedence to the UI tasks having the FG priority over the UI tasks having the BG priority, and (ii) for any UI display, retains in-order execution of the UI tasks associated with the UI display, and to execute the UI tasks in accordance with the schedule.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for Preloading, Pre-rendering and Prefetching (PPP) in user devices.

In the present context, the term "preloading" refers to the process of loading, launching and at least partially running an app in a background mode, not in response to (and typically before) invocation of the app by the user. The term "pre-rendering" refers to the process of constructing a UI display of an app in the background mode. The term "UI display" in this context refers to a logical UI element—A view or a window. In the Android OS, for example, UI displays are referred to as Views or Activities.

Note that pre-rendering may involve UI tasks that modify the UI display, and/or UI tasks that do not directly modify the UI display but are prerequisite to such modification or are synced to modification of the UI display in the background. Thus, for example, initialization or preparatory tasks that are performed when preloading an app and preparing to initialize or modify a UI display of the app are also regarded herein as pre-rendering tasks.

The term "prefetching" refers to the process of fetching content over a network, from a content source to a local cache memory of the user device, not in response to an explicit request or access by the user.

In some embodiments, as part of preloading an app, the user device pre-renders a UI display of the app in the background. The UI display being pre-rendered may comprise various content items, e.g., text, images, graphics, videos and the like. In some embodiments, the user device pre-renders at least some of the content of the UI display using an "off-line pre-render mode" in which fetching of content over the network to the user device is not permitted.

The off-line pre-render mode can be implemented in various ways. For example, instead of fetching content items over the network, the user device may pre-render locally-cached versions of the content items regardless of whether they are fresh or stale or up to a predefined extent of staleness. As another example, the user device may pre-render empty "placeholder" content items having similar dimensions as the actual content items. When the user requests to access the app in question, the user device moves the pre-rendered UI display to the foreground, so as to present the pre-rendered content to the user. At this stage, the user device may refresh missing or stale content items over the network.

Some disclosed techniques assume that the app supports the off-line pre-rendering mode. Other disclosed techniques do not make this assumption. For apps that do not support the off-line pre-rendering mode, various ways of enforcing off-line pre-rendering, i.e., preventing apps' network requests from reaching the network, are described.

Additionally or alternatively to the off-line pre-render mode, the user device may support an on-line pre-render mode in which fetching of content over the network is permitted. As opposed to on-line pre-rendering, which does not restrict network access, the off-line pre-rendering mode balances user experience with cost. In other words, on-line pre-rendering minimizes the latency of presenting the user a fully operational and relatively fresh UI display, but on the other hand incurs data costs, along with related power/battery drain costs. The off-line pre-rendering mode reduces the data cost for the user device and/or the app server, but may initially present to the user an incomplete or relatively stale UI display for a short period of time. As such, the off-line pre-rendering mode enables a flexible trade-off between latency and cost. Embodiments that combine (e.g., choose between) off-line and on-line pre-rendering are also described.

Other disclosed embodiments relate to handling of "parse chains." In practice, a content item often links to one or more additional ("nested") content items, each of which may link to one or more yet additional content items, and so on. An app that receives such a content item typically parses it, discovers one or more additional content items within the parsed content item, requests to fetch the discovered content items, and so on. In some embodiments, the user device runs an agent that handles parse chains.

In particular, the agent decides, for each additional content item being identified as part of a parse chain, whether to fetch the content item over the network or not. The agent may use various criteria for deciding whether or not to fetch an additional content item, and in particular to decide whether to terminate the parse chain entirely. The disclosed parse-chain handling techniques are useful in various use-cases. Examples relating to pre-rendering and to general prefetching are described. In pre-rendering, the selective fetching of content items in a parse chain is used as a "hybrid pre-rendering" mode. Such a mode is useful, for example, for reducing costs such as integration effort, data usage and battery drain.

Yet other disclosed embodiments relate to correct prioritization and scheduling of foreground and background UI tasks that are associated with the same UI display. In some operating systems, for example iOS and Android, such UI tasks are typically handled by a single UI thread per app in the user device. In particular, disclosed techniques address the case of a user performing some action in the foreground with respect to a UI display of an app, while another UI display of the same app is being pre-rendered in the background. Such cases are challenging for several reasons. For example, unless handled properly, pre-rendering UI tasks might cause the app to appear non-responsive to the user's actions. As another example, since UI tasks of a given UI display should be handled in-order, it would be incorrect to execute the user-action-related UI tasks before any pending pre-rendering-related UI tasks. As noted above, pre-rendering UI tasks may comprise tasks that modify the UI display directly, and/or initialization or prerequisite tasks that do not directly modify the UI display.

In some embodiments, an agent running in the user device overcomes such challenges by proper prioritization and scheduling of the UI tasks. As explained in detail herein, the agent assigns each UI task a priority selected from at least a Foreground (FG) priority and a Background (BG) priority. In addition, the agent associates each UI task with the UI display (also referred to as "scenario") processed by this UI task. The agent schedules the UI tasks for execution in accordance with a schedule that (i) gives precedence to the UI tasks having the FG priority over the UI tasks having the BG priority, and (ii) for any UI display, retains in-order execution of the UI tasks associated with the UI display. The UI tasks are then executed in accordance with the schedule.

In some embodiments, in order to retain in-order execution of the UI tasks of a given UI display, the agent applies a "promotion" mechanism that promotes selected UI tasks from the BG priority to the FG priority. In response to creation of a new UI task having the FG priority (e.g., a UI task derived from a user action), the agent identifies all UI tasks that are both (i) associated with the same UI display as the new UI task and (ii) assigned the BG priority, and promotes the identified UI tasks to the FG priority. The agent schedules the promoted UI tasks to be executed before the new UI task, and also retains the original order of execution among the promoted UI tasks.

System Description

Figure 1:
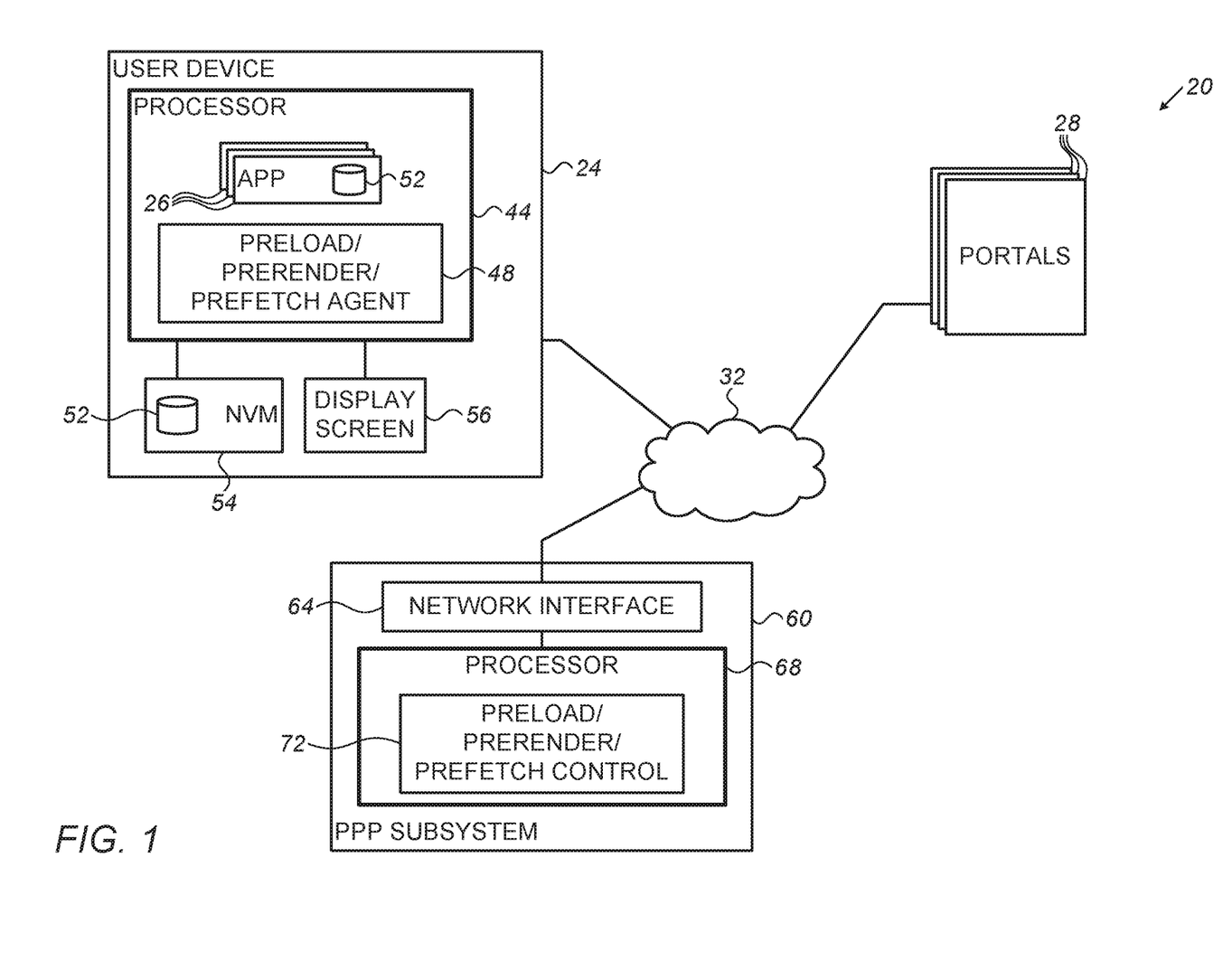
FIG. 1 is a block diagram that schematically illustrates a communication system that employs Preloading, Pre-rendering and Prefetching (PPP), in accordance with an embodiment of the present invention.

FIG. 1 is a block diagram that schematically illustrates a communication system 20 that employs Preloading, Pre-rendering and Prefetching (PPP), in accordance with an embodiment of the present invention.

System 20 comprises a user device 24, which runs one or more user applications ("apps") 26. Device 24 may comprise any suitable wireless or wireline device, such as, for example, a cellular phone or smartphone, a wireless-enabled laptop or tablet computer, a desktop personal computer, a video gaming console, a smart TV, a wearable device, an automotive user device, or any other suitable type of user device that is capable of communicating over a network and presenting content to a user. The figure shows a single user device 24 for the sake of clarity. Real-life systems typically comprise a large number of user devices of various kinds.

In the present context, the terms "user application," "application" and "app" are used interchangeably, and refer to any suitable computer program that runs on the user device and may be invoked (activated) by the user. Some apps 26 may be dedicated, special-purpose applications such as game apps. Other apps 26 may be general-purpose applications such as Web browsers.

In some embodiments, although not necessarily, apps 26 are provided by and/or communicate with one or more network-side servers, e.g., portals 28, over a network 32. Network 32 may comprise, for example a Wide Area Network (WAN) such as the Internet, a Local Area Network (LAN), a wireless network such as a cellular network or Wireless LAN (WLAN), or any other suitable network or combination of networks.

In the present example, user device 24 comprises a processor 44 that carries out the various processing tasks of the user device. Among other tasks, processor 44 runs apps 26, and also runs a software component referred to as a Preload/Pre-render/Prefetch (PPP) agent 48, which handles preloading of apps, content pre-rendering and/or content prefetching. Apps 26 and PPP agent 48 are drawn schematically inside processor 44, to indicate that they comprise software running on the processor.

In addition, user device 24 comprises a Non-Volatile Memory (NVM) 54, e.g., a Flash memory. NVM 54 may serve, inter alia, for storing a cache memory 52 for caching content associated with apps. In some embodiments the user device uses a single cache 52. In other embodiments, also depicted schematically in the figure, a separate cache memory 52 may be defined per app. Hybrid implementations, in which part of cache 52 is centralized and some is app-specific, are also possible. For clarity, the description that follows will refer simply to "cache 52", meaning any suitable cache configuration.

User device 24 further comprises a display screen 56 for presenting visual content to the user, and a suitable network interface (not shown in the figure) for connecting to network 32. This network interface may be wired (e.g., an Ethernet Network Interface Controller—NIC) or wireless (e.g., a cellular modem or a Wi-Fi modem). Typically, user device 24 further comprises some internal memory, e.g., Random Access Memory (RAM)—not shown in the figure—that is used for storing relevant code and/or data.

In the example embodiment of FIG. 1, although not necessarily, system 20 further comprises a PPP subsystem 60 that performs preloading, pre-rendering and/or prefetching tasks on the network side. Subsystem 60 comprises a network interface 64 for communicating over network 32, and a processor 68 that carries out the various processing tasks of the PPP subsystem. In the present example, processor 68 runs a PPP control unit 72 that carries out network-side PPP tasks. Network-side PPP tasks may comprise, for example, deciding which apps to preload and when, or choosing whether and which in-app content to preload, deciding how much of an app component to preload (e.g., only executing some initial executable code, or pre-rendering of the app's user interface), to name just a few examples. In an embodiment, PPP subsystem 60 may be implemented as a cloud-based application.

In the embodiments described herein, for the sake of clarity, the PPP tasks are described as being carried out by processor 44 of user device 24. Generally, however, PPP tasks may be carried out by processor 44 of device 24, by processor 68 of subsystem 60, or both. Thus, any reference to "processor" below may refer, in various embodiments, to processor 44, processor 68, or both.

Preloading an app 26 may involve preloading any app element such as executable code associated with the app, e.g., launch code, app feed, app landing page, various UI elements associated with the app, content associated with the app, app data associated with the app, and/or code or content that is reachable using the app by user actions such as clicks ("in-app content"). Pre-rendering of content is typically performed in an app that has been preloaded and is currently running in the background. Pre-rendering may involve background processing of any suitable kind of UI display, or a portion thereof. In Android terminology, for example, pre-rendering may comprise background processing of one or more Android Activities. In the background mode, UI elements associated with the app are not presented to the user on display screen 56, i.e., are hidden from the user. When the user invokes a previously-preloaded app, the user device switches to run the app in a foreground mode that is visible to the user. (The terms "background mode" and "foreground mode" are referred to herein simply as "background" and "foreground," for brevity.)

The configurations of system 20 and its various elements shown in FIG. 1 are example configurations, which are chosen purely for the sake of conceptual clarity. In alternative embodiments, any other suitable configurations can be used. For example, in some embodiments the PPP tasks may be implemented entirely in processor 44 of user device 24, in which case subsystem 60 may be eliminated altogether.

PPP agent 48 may be implemented in a software module running on processor 44, in an application running on processor 44, in a Software Development Kit (SDK) embedded in an application running on processor 44, as part of the Operating System (OS) running on processor 44 (possibly added to the OS by the user-device vendor or other party), in a proxy server running on processor 44, using a combination of two or more of the above, or in any other suitable manner. In most of the description that follows, PPP agent 48 is assumed to be part of the OS of user device 24.

Although the embodiments described herein refer mainly to human users, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 52 may be implemented using one or more memory or storage devices of any suitable type. In some embodiments, PPP agent 48 and/or subsystem 60 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Content Pre-Rendering Using Off-Line Pre-Render Mode

A UI display of an app 26 may comprise various content items, such as text, images, videos, graphics and/or other visual elements, which are laid-out visually in accordance with a specified layout. Rendering of a UI display typically calls for fetching the content items over the network. When pre-rendering a UI display in the background, however, it is possible, and sometimes beneficial, to limit the extent of network access, e.g., in order to reduce power consumption, cost and/or cellular data usage.

In some embodiments, user device 24 supports an "off-line pre-render" mode that performs pre-rendering but without permitting fetching of content over network 32 to the user device. The off-line pre-render mode is also referred to herein as "off-line mode" for brevity. In some embodiments, the app whose content is being pre-rendered, and/or the OS of the user device, is required to support the off-line pre-render mode. In other embodiments, no such support is assumed.

In various embodiments, the techniques described herein may be performed by PPP agent 48, by the OS of user device 24 that runs on processor 44, and/or by apps 26. Any suitable partitioning ("division of labor") between the PPP agent, the OS and the apps can be used. In some embodiments, the actual pre-rendering and rendering of content is performed by the apps. The PPP agent is configured to trigger the apps, e.g., to notify an app that off-line pre-rendering is being used. The PPP agent is implemented as a component of the OS, and both the PPP agent and the apps are orchestrated by the OS. This partitioning, however, is chosen purely by way of example. For clarity, some of the description that follows refers simply to processor 44 as carrying out the disclosed techniques.

The description that follows refers to a single app 26 that has been preloaded and whose content is being pre-rendered. This choice is made purely for the sake of clarity. Generally, the off-line pre-render mode can be applied to any app in user device 24, to all apps, to a selected subset of one or more apps, or otherwise.

For apps that already have some existing off-line features, such as the ability to launch and render content regardless of network availability, the use of off-line pre-rendering allows leveraging these existing features to integrate pre-rendering functions more easily. In such apps, much of the value of on-line pre-rendering (having no restrictions on network access) can be retained at a considerably lower cost. For apps that do not already have off-line user experience, the end result of having a good off-line user experience provides an added incentive for integration of pre-rendering.

In some embodiments, before the off-line pre-render mode is enabled for a given app 26, the app is required to declare to agent 48, e.g., via a suitable Application Programming Interface (API), that it supports the off-line pre-render mode. Supporting off-line pre-rendering is beneficial to apps, for example since it allows preloading to be scheduled more often (in comparison with on-line pre-render in which network requests are allowed) and regardless of network conditions.

In some embodiments, agent 48 intercepts requests from the app to fetch content over the network, and declines the requests if the app is being pre-rendered in the off-line mode. For example, agent 48 may respond to such requests with a response indicating that the network is unavailable, e.g., a "not connected" response. Alternatively, agent 48 may use any other suitable technique for blocking content requests from accessing the network.

In some embodiments, in the off-line mode, the app may pre-render content items that are cached locally in cache 52 instead of fetching them over the network, provided that cache 52 indeed contains copies of the content items. In some embodiments, in the off-line mode the app pre-renders cached content items even if they are known to be stale, i.e., not fresh. This is contrast to on-line pre-rendering, in which the app will typically fetch requested content over the network if the cached content is not fresh. In an embodiment, in the off-line mode the app will not pre-render a cached content item if it is staler than a predefined extent, e.g., older than a predefined age.

In some embodiments, in the off-line mode, the app will pre-render a "placeholder" content item instead of the actual content item that is specified for display in the UI display. This technique may be used, for example, if the app requests a content item that is not available locally (or is staler than a predefined extent) in cache 52. The placeholder content item is typically an empty content item that has a similar layout (e.g., similar dimensions) to the actual content item. Subsequently, e.g., when the user accesses the app, the app may fetch and insert the actual content item seamlessly in-place into the pre-rendered UI display.

In some embodiments, agent 48 notifies the app that its UI display is being pre-rendered in accordance with the off-line mode, and therefore network requests are expected to fail or are not expected. Alternatively, the app may query agent 48, e.g., via a suitable API, whether a UI display of the app is being pre-rendered and using which mode.

In some embodiments, when using such an API, the app performs both off-line pre-rendering and on-line pre-rendering (and possibly also normal rendering in the foreground) using the same launch code, but the execution of this launch code differs between the different modes.

In an example embodiment, when operating in the off-line pre-rendering mode the app's launch code loads and pre-renders only the parts of the UI display that do not require any network resources. As a result, during pre-rendering, the app starts running in the background but stops its progress at a point before it requires network access. Time app may not be fully operational in this state, and may require more processing to become usable. Processing is resumed once the user accesses the app. This technique considerably reduces the latency from the time the user accesses the app to the point the UI display is fully presented and operational, and at the same time does not require network access while in the background.

In some embodiments, PPP agent 48 penalizes ("punishes") an app 26 that initiates network requests while in the off-line pre-render mode. Penalizing an app may comprise, for example, disallowing or reducing the rate of subsequent off-line pre-rendering, since the app's network requests indicate that the app behaves improperly in the off-line mode.

Figure 2:
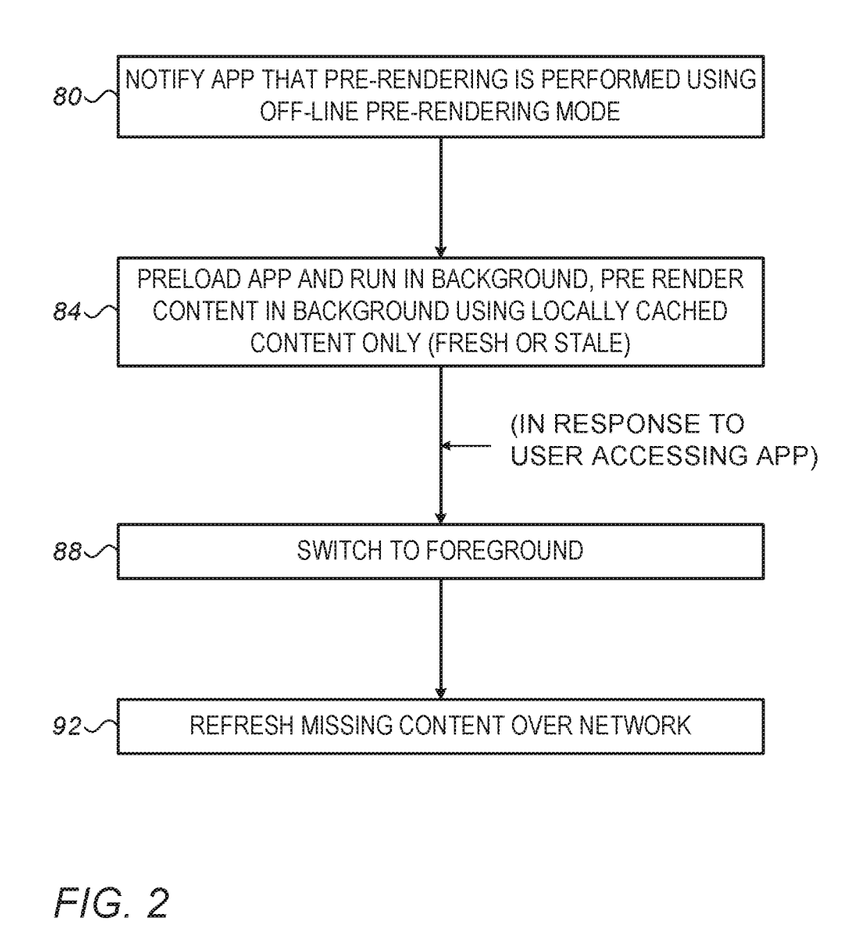
FIG. 2 is a flow chart that schematically illustrates a method for content pre-rendering using an off-line pre-render mode, in accordance with an embodiment of the present invention.

FIG. 2 is a flow chart that schematically illustrates a method for content pre-rendering using the off-line pre-render mode, in accordance with an embodiment of the present invention. It is noted that the flow of FIG. 2 is depicted purely by way of example, in order to demonstrate certain features relating to off-line pre-rendering. In alternative embodiments, the off-line pre-render mode can be implemented and utilized in any other suitable way.

The method of FIG. 2 begins with PPP agent 48 notifying an app 26 that its UI display is to be pre-rendered using the off-line pre-rendering mode, at a notification step 80. At a preloading/pre-rendering step 84, the OS loads the app launch code and runs the app in a background mode. Since the app was notified of the off-line pre-rendering mode, the app pre-renders its UI display using locally-cached content only.

At any stage of the preloading and pre-rendering process, the user may access the app. In such a case, PPP agent switches to run the app in the foreground so that the UI display is presented to the user on display screen 56, at a foreground switching step 88. At this stage, the app's UI display is typically incomplete, since it comprises only elements that were obtainable off-line. The app then refreshes any missing or stale content in the UI display over network 32, at a refreshing step 92. The refreshing operation can be performed entirely by the app or it can be assisted by agent 48.

In some embodiments, content items that are fetched after off-line pre-rendering is completed, or even after the pre-rendered UI display is moved to the foreground, can be inserted by the app into the UI display with minimal visual impact. In other words, content items may be inserted without requiring complete refreshing or re-rendering of the entire UI display, or requiring only refreshing of only the content items being replaced.

On-Line Pre-Rendering Mode

In some embodiments, all pre-rendering in user device 24 is performed using the off-line mode. In other embodiments, additionally or alternatively to the off-line mode, the user device supports an "on-line pre-render" mode (also referred to as "on-line mode" for brevity) in which fetching of content over network 32 for a preloaded app 26 is allowed.

In some embodiments, before the on-line pre-render mode is enabled for a given app 26, the app is required to declare to PPP agent 48, e.g., via a suitable API, that it supports the on-line pre-render mode. An app may use this API, for example, to declare that it can cope with the server load associated with on-line pre-rendering.

Any suitable criterion can be used for choosing whether to pre-render a given UI display of a given preloaded app using the on-line mode or using the off-line mode. For example, agent 48 may learn the data usage pattern of the app, and use this information to decide whether and when to use the on-line pre-rendering mode. As another example, agent 48 may monitor the data usage of the app in real-time, and revert to off-line pre-rendering if the amount of data fetched over the network is too large, e.g., larger than a threshold. In such a case, agent 48 may also avoid further pre-rendering, and/or notify the app developer that the app is not behaving properly when being pre-rendered.

In some embodiments, when the app declares support for both the off-line pre-render mode and the on-line pre-render mode, PPP agent 48 chooses between the two triodes considering the lower cost of off-line pre-rendering and the potential for better user experience offered by on-line pre-rendering. The choice may be based, for example, on current and/or expected network conditions, learned usage patterns of the user, hints from the app regarding expected usage patterns provide to agent 48 via an API, user device limitations, a maximal permitted rate of preloading/pre-rendering (as detailed below), maximal permitted content staleness (as detailed below), and the like. User-device limitations may comprise, for example, battery state, whether the device is connected to an external power supply, data saving modes, RAM size, Flash size and/or data budget.

In some embodiments, the app may specify a maximum allowed rate of pre-rendering for the off-line mode, for the on-line mode, or for both. One motivation for this feature is to ensure that pre-rendering operations do not overload the app's servers (e.g., portals 28). For example, the app may specify a limit of two on-line pre-rendering operations per day, or one off-line pre-rendering operation and one on-line pre-rendering operation for every activation of the app by the user.

In some embodiments, the app may specify a maximal permitted content staleness for the off-line mode, for the on-line mode, or for both. One motivation for this feature is to ensure that the pre-rendered content that the user can see is not older than a given maximal staleness threshold. In an example embodiment, the OS enforces the maximal permitted content staleness by either destroying the preloaded content or by triggering a refresh of this content (e.g., pre-rendering again) upon reaching the specified maximal staleness.

Content Prefetching and Pre-Rendering Using Parse Chains

In many practical cases, a content item, e.g., a Web page or app Feed, comprises one or more additional content items, each of which may link to one or more yet additional content items, and so on. Fetching of such a nested content item for an app 26 can be viewed as a "parse chain": Typically, the app receives the content item, parses it, discovers one or more additional content items within the parsed content item, requests to fetch the discovered content items, and so on. The app may continue this process until no more nested content items are found.

In some embodiments, when executing a parse chain, PPP agent 48 controls the fetching of content items for the requesting app 26. The PPP agent may fetch the content items itself, or it may decide and instruct the app whether or not to fetch certain content. In particular, in some embodiments agent 48 decides, for each additional content item being identified as part of the parse chain, whether to fetch the content item over the network or not. If the decision is not to fetch a content item, the app's network request is ignored. In such an event, the PPP agent would typically notify the app that the network request has failed, or that the network request will not be served. Agent 48 may use various criteria for deciding whether an additional content item should be fetched or not, and in particular to decide whether to terminate the parse chain entirely.

The control of agent 48 over parse chains is advantageous in various use-cases. One example use-case is a preloaded app that runs in the background, and whose UI display is being pre-rendered in the background. In such embodiments, agent 48 may use the selective fetching of content items as a "hybrid pre-rendering" mode. In this mode, when agent 48 permits app 26 to fetch an additional content item that was identified by the app as part of the parse chain, the app also pre-renders the additional content item in the background. When agent 48 decides not to fetch an additional content item, this content item will not be pre-rendered (and will typically be fetched and rendered only once the user accesses the app and the UI display is moved to the foreground). Executing such a prefetch parse chain during pre-rendering is useful, for example, for reducing costs such as integration effort, data usage and battery drain.

In some embodiments, the app is required to declare that it supports the hybrid pre-rendering mode before the mode becomes available. Once declared, agent 48 uses the hybrid pre-rendering mode instead of non-selective on-line pre-rendering.

Another use-case relates to prefetching, but not in the context of pre-rendering. Consider, for example, an app that runs in the background, for which agent 48 prefetches content but does not perform pre-rendering. This use-case is useful, for example, if pre-rendering is considered too costly or is otherwise not desired or not feasible. Pre-rendering may be unavailable, for example, when agent 48 is implemented as part of an app on an OS that does not allow pre-rendering.

In some embodiments, agent 48 may handle a parse chain by intercepting some or all of the network calls that occur during pre-rendering or prefetching. Such network calls are treated as optional requests to be prefetched only under certain criteria, e.g., criteria relating to efficiency or safety. Network calls that are not intercepted by agent 48, if any, may be allowed to reach the network or may be blocked, as appropriate.

In some embodiments, PPP agent 48 implements a parse chain by providing a suitable API to the app. The app uses this API for sending requests to agent 48 for prefetching content items (instead of the app issuing network calls directly).

Benefits of the disclosed parse-chain handling scheme include, for example:
  Simplicity of integration: The content items to be prefetched are discovered through the existing app loading procedure.
  Ability to prioritize content items to prefetch, avoiding downloading of content items that are not deemed worthy of the associated costs.
  Ability to use efficient and safe prefetch techniques instead of the app's default network requests. Such techniques may involve monitoring the progress of the prefetch and terminating the downloads if too slow, blacklisting content items that repeatedly fail to download, redirecting to download content from separate servers, limiting prefetch resources depending on recent usage of the app, and/or any other suitable technique.

As can be appreciated, when carrying out the disclosed parse chain technique, some of the app's network requests may be ignored by agent 48. Therefore, in some embodiments the app is expected to handle ignored network requests correctly, as if the app was run in an off-line pre-render mode, for example by obtaining the requested content from cache 52.

In some embodiments, if a parse chain was terminated by agent 48, the app may choose to continue the parse chain by parsing a content item cached in cache 52, such as images that are linked through a feed json.

In some embodiments, the app provides agent 48 information relating to a content item, and agent 48 takes this information into account in deciding whether or not to download the content item. Such information may indicate, by way of example:

Whether the content item was discovered from cache and therefore may be stale.

A priority assigned to the content item. For example, content items discovered from cache may be given low priority.

A timestamp indicating the time the content item was last known to be needed.

The expected media type (e.g., text file, image, video).

The expected size of the file.

Figure 3:
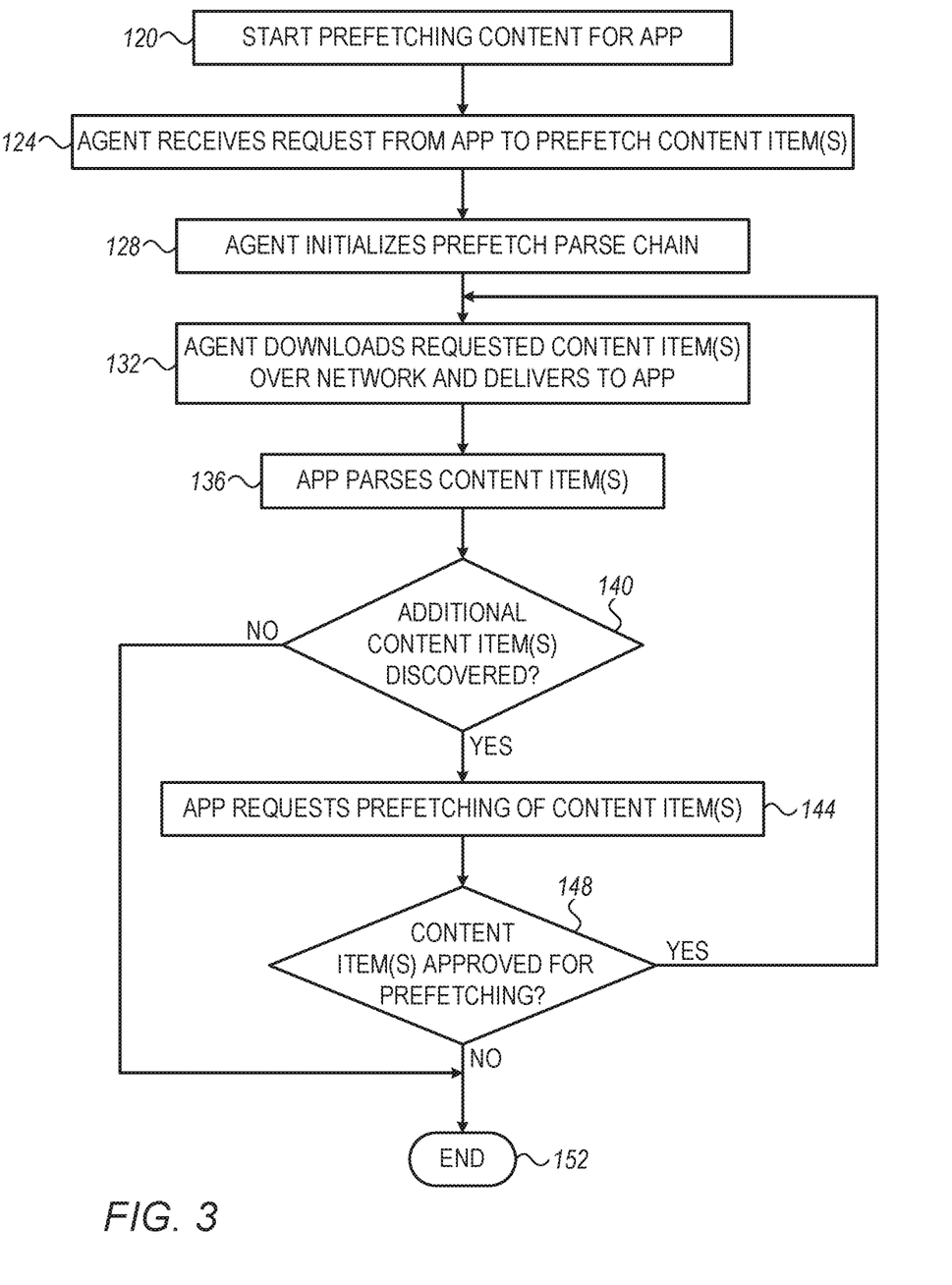
FIG. 3 is a flow chart that schematically illustrates a method for content prefetching using a prefetch parse chain, in accordance with an embodiment of the present invention.

FIG. 3 is a flow chart that schematically illustrates a method for content prefetching using a prefetch parse chain, in accordance with an embodiment of the present invention. The method flow is described in the context of prefetching (without pre-rendering), by way of example. In alternative embodiments, pre-rendering can be implemented in a similar manner as explained above. Also for simplicity, the method flow describes a process that terminates the entire parse chain after prefetching some of the content items. This flow, however, is not mandatory. In alternative embodiments, agent 48 may decide not to prefetch certain content items, but nevertheless proceeds with execution of the parse chain and may subsequently decide to prefetch other content items that are discovered later.

The method of FIG. 3 begins with an app 26, e.g., an app that was preloaded and is currently running in a background mode in user device 24, beginning to prefetch content, at a prefetch initiation step 120. At a request input step 124, PPP agent 48 receives from the app a request to prefetch one or more content items. At a chain initialization step 128, agent 48 initializes a prefetch parse chain for the app.

At a downloading step 132, agent 48 downloads the requested content item(s) over network 32 and delivers the content item(s) to app 26 (or alternatively permits the app to download the requested content item(s)). The app parses the content item(s), at a parsing step 136. At a nesting checking step 140, the app checks whether the content item(s) delivered at step 132 link to additional content item(s) to be downloaded. If so, the app requests agent 48 to prefetch the additional content item(s), at an additional requesting step 144.

Agent 48 evaluates a criterion that decides whether to approve or decline the app's request for additional content item(s), at a prefetching evaluation step 148. (In some embodiments the criterion can be evaluated for the initial content item(s) requested by the app, as well.) If the criterion indicates that the additional content item(s) are approved for prefetching, the method loops back to step 132 above, in which agent 48 and/or app 26 downloads the additional content item(s), i.e., executes the next prefetch stage of the parse chain. If the criterion indicates that the additional content item(s) are not approved for prefetching, agent 48 terminates the parse chain, at a termination step 152. The method also jumps to step 152 upon finding, at step 140, that no additional content items are to be prefetched in the preset parse chain.

At any stage of the above flow, the user may access the app. In such a case, agent 48 and/or the app refreshes any missing or stale content over the network.

Prioritizing of Background and Foreground UI Tasks

In some embodiments, the OS of user device 24 executes multiple UI tasks for the various apps 26. Each UI task specifies an action that processes a certain UI display of an app. Some UI tasks may modify the UI display directly, whereas other UI tasks do not directly modify the UI display but are prerequisite to such modification or are synced to modification of the UI display. In the Android OS, for example, UI displays are referred to as Views or Activities. A UI display is also referred to herein as a "scenario". Some UI tasks may originate from user actions, whereas other UI tasks may relate to background pre-rendering.

In some cases, the OS runs a single UI thread per app 26. Consider a case in which a user performs actions that affect a UI display of a certain app, while another UI display of the same app is being pre-rendered in the background. In such a case, the UI tasks derived from the user's actions and the UT tasks relating to pre-rendering all compete for the resources of the same single UI thread. Unless handled properly, the pre-rendering UI tasks might cause the app to appear non-responsive to the user's actions.

Another challenge encountered in the above situation is the need to retain in-order execution of UI tasks associated with a given UI display. Consider, for example, a situation in which one or more pre-rendering UI tasks for a given UI display are pending for execution, and then a user performs an action that modifies the same UI display. In such a case, even though the user's action is in the foreground and are more latency-sensitive than the background pre-rendering tasks, it would be incorrect to execute the user's UI tasks before the pending pre-rendering tasks.

Typically, the in-order requirement holds for UI tasks associated with the same UI display, but UI tasks of different UI displays are allowed to be handled out-of-order.

In some disclosed embodiments, PPP agent 48 in user device 24 overcomes such challenges by correctly prioritizing and scheduling the various UI tasks. In some embodiments, PPP agent 48 assigns to each UI task a priority selected from at least a Foreground (FG) priority and a Background (BG) priority. In addition, PPP agent 48 associates each UI task with the UI display ("scenario") being processed (e.g., modified or prepared, for example) by this UI task. PPP agent 48 then schedules the UI tasks for execution in accordance with a schedule that (i) gives precedence to the UI tasks having the FG priority over the UI tasks having the BG priority, and (ii) for any UI display, retains in-order execution of the UI tasks associated with the UI display. Typically, in specifying the schedule, the PPP agent does not enforce any constraints as to the order of execution of UI tasks associated with different UI displays (other than, of course, giving precedence to FG tasks over BG tasks). The UI tasks are then executed in accordance with the schedule.

In some embodiments, in order to retain in-order execution of the UI tasks of a given UI display, PPP agent 48 applies a "promotion" mechanism that promotes selected UI tasks from the BG priority to the FG priority. In response to creation of a new UI task having the FG priority (e.g., derived from a user action), agent 48 identifies all UI tasks that (i) are associated with the same UI display as the new UI task and (ii) have the BG priority, and promotes the identified UI tasks to the FG priority. Agent 48 then schedules the promoted UI tasks to be executed before the new UI task. Agent 48 also retains the original order of execution among the promoted UI tasks.

In some embodiments, a UI task may be associated with multiple UI displays, in which case agent 48 promotes the UI task if a new FG-priority UI task is added in any of these multiple UI displays.

In some embodiments, PPP agent 48 represents the various UI tasks as messages. In the description that follows, the terms "UI task" and "message" are used interchangeably. A single user action, or a single UI change by the app or the user device in general, may be translated into several smaller UI tasks, e.g., drawing a portion of the screen, invoking an app callback or creating a new view or screen. Each such UI task is represented by a message. Agent 48 queues the messages in a suitable queue structure, and schedules the queued messages for execution by the UI thread.

Any suitable queue structure can be used for queuing the messages, e.g., a priority queue, a set of queues with each queue holding the messages of a respective priority, a multi-threaded UI environment with each thread assigned to handle messages of a respective priority, or even a multi-process structure in which different processes handle different priorities.

In some embodiments, agent 48 starts a predefined time-out (denoted T1) following the execution of a foreground message, and ensures that background messages are only handled if no foreground messages have been handled for T1 seconds.

In some embodiments, agent 48 may schedule messages to be handled at a specified time in the future, and halt the handling of background messages if a foreground message is scheduled to be handled in the near future. The time interval considered "near future" in this context may be constant (denoted T2), or may be based on an estimation of the expected running time of the background message in question. For example, if a foreground message is scheduled to start being handled in three seconds, then a background message whose handling is expected to take two seconds will be allowed to proceed, while a background message whose handling expected to take four seconds will not be allowed to proceed at this time.

In some embodiments, agent 48 may delete a background message if its associated UI display becomes no longer relevant. For example, in the Android OS, when an Activity is destroyed, if a UI display based on that Activity exists, agent 48 deletes all messages associated with this UI display.

In various embodiments, UI tasks may be assigned priorities in various ways. For example, the app developer may specify the priority of each UI task or message to be queued. As another example, the app developer may specify the priority of a certain UI display that needs to be processed. In this case, messages associated with this display will receive the specified priority. In some embodiments the priority may be assigned automatically by agent 48. For example, tasks that are independent of immediate needs of the user may be assigned BG priority.

In some embodiments, specific UI components may be modified to take advantage of the priority system, and some or all of their tasks are assigned to BG priority. Consider, for example, a UI component that holds multiple tabs that the user may browse, such as Android ViewPager. Such a component may load multiple tabs together, assign FG priority only to the visible tab, and BG priority to adjacent tabs. This assignment helps provide the fastest response to the user while still loading adjacent tabs ahead of time.

In some embodiments, agent 48 may automatically assign BG priority to views that are drawn but not currently visible, for example views that are "below-the-fold" and require scrolling to become visible.

In some embodiments, agent 48 creates UI displays (e.g., views or Android Activities) predictively before the user requires them, and sets the priorities of their UI tasks to BG priority.

In some embodiments, agent 48 assigns more than two priorities. For example, non-visible views (i.e., views that are "below-the-fold") of a foreground activity may have higher priority than views of other pre-rendered activities, but lower priority than the view which is visible. The promotion among multiple priorities may be defined such that when a message with a specific priority P and UI display S is sent, all messages of UI display S with priorities that are lower that P are promoted to priority P.

In various embodiments, UI tasks (messages) may be associated with UI displays ("scenarios") in various ways. In some embodiments, PPP agent 48 associates UI tasks with UI displays automatically. For example, in the Android OS, example associations may comprise:

For an Activity's main Handler, the Handler is marked with the Activity as the associated UI display, which the Handler then assigns to all messages passing through it.

For views that are attached to an Activity, the Activity may be set as the UI display by default for messages related to those views.

Messages that pass the Activity as a parameter, set the message's UI display to be the Activity. Note that the Android OS regularly sends the Activity as a parameter to some of the messages related to the Activity.

In some embodiments, the app developer may choose which UI display is associated per message. In such embodiments, and if agent 48 also automatically associates messages with UI displays, then the developer's choice may override the choice of agent 48.

In some embodiments, agent 48 may modify pre-rendering related UI tasks to take into account that the results are not immediately visible to the user. For example, agent 48 may reduce the frame-rate for background. UI tasks, or may avoid running animations, jumping directly to the end result of the animation. Such manipulation is done to reduce the load introduced by background tasks, while also completing the background tasks faster. In some embodiments, agent 48 may split UI tasks into smaller portions, so that handling each message may be quick, allowing greater control over message scheduling.

In some embodiments, if a FG message is created while a BG message is being handled, agent 48 allows the running BG message to complete before handling the FG message. In other embodiments, agent 48 pauses handling of the BG message, saves the state of the paused message, then handles the FG message, and then resumes handling of the paused BG message from the saved state. In yet other embodiments, agent 48 stops handling the BG message and reverses its effects, then handles the FG message, and then retries handling the BG message from the beginning. To this end, agent 48 may use a transaction system for messages, so that the effects of a message will not persist unless the message is handled completely and committed.

Figure 4:
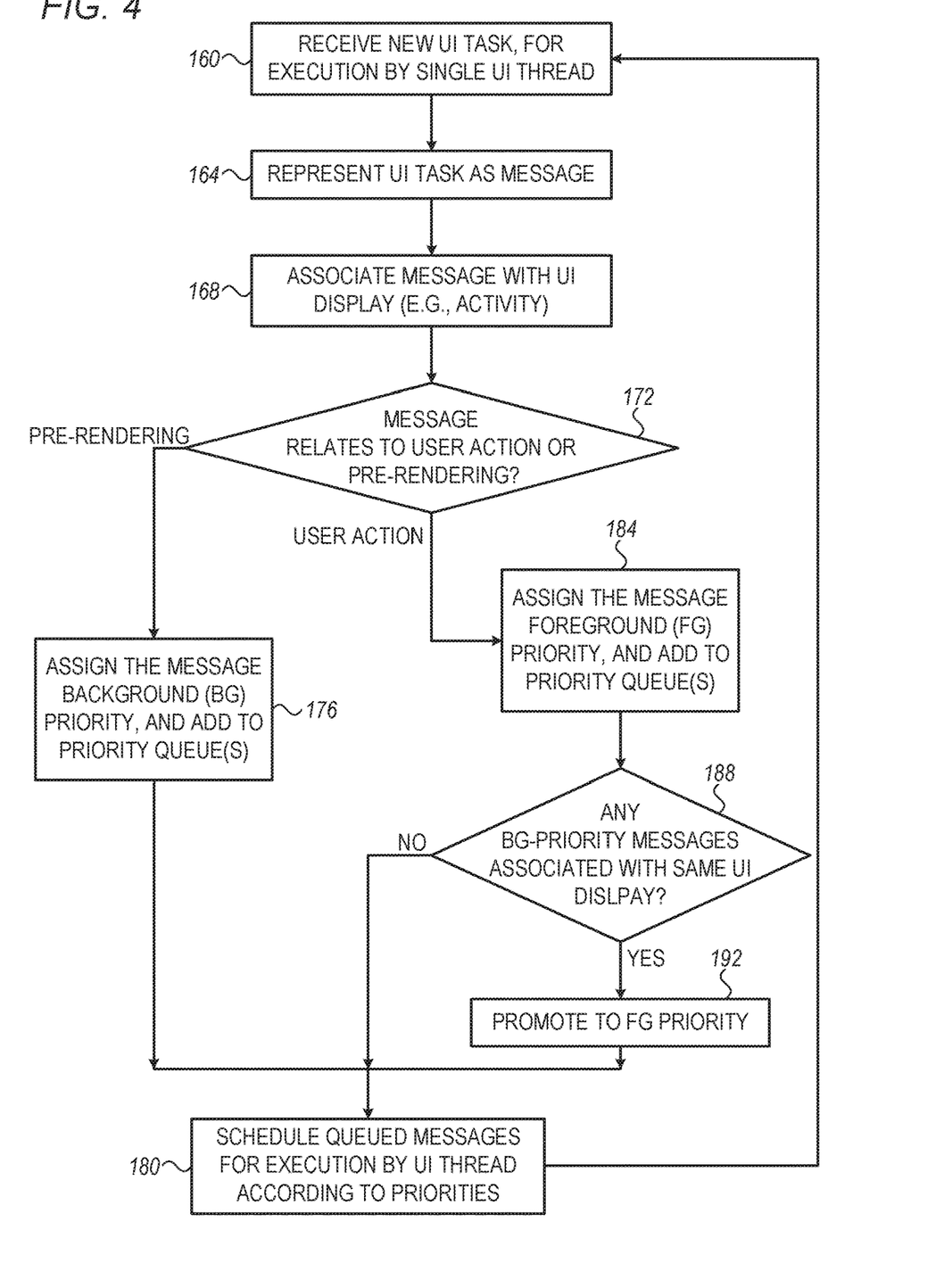
FIG. 4 is a flow chart that schematically illustrates a method for handling background and foreground User Interface (UI) tasks using a single UI thread, in accordance with an embodiment of the present invention.

FIG. 4 is a flow chart that schematically illustrates a method for handling background and foreground UI tasks using a single UI thread, in accordance with an embodiment of the present invention. The method begins with PPP agent 48 receiving a new UI task, at a task input step 160. Agent 48 represents the new UI task as a message, at a message representation step 164, and associates the message with a UI display (a "scenario", e.g., an Android Activity), at a scenario assignment step 168.

At a FG/BG checking step 172, agent 48 checks whether the message relates to a user action or to a pre-rendering operation. If the message relates to pre-rendering, agent 48 assigns the message a BG priority and adds the message to the queue structure, at a BG prioritization step 176. Agent 48 schedules the message for execution, at a scheduling step 180.

If, on the other hand, the message was derived from a user action, agent 48 assigns the message a FG priority and adds the message to the queue structure, at a FG prioritization step 184. Agent 48 then checks whether any of the queued messages are both (i) assigned the BG priority and (ii) associated with the same UI display ("scenario") as the new FG message. If so, agent 48 promotes these messages to the FG priority, at a promotion step 192. With or without promotion, agent 48 proceeds to schedule the message at scheduling step 180.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a user device that is configured to communicate over a network, preloading an application in a background mode in which content presented by the application is hidden from a user of the user device;
   pre-rendering at least part of the content presented by the application in an off-line pre-render mode, wherein pre-rendering in the off-line pre-render mode comprises (i) pre-rendering only content that is available locally in the user device and (ii) inhibiting fetching of any content over the network to the user device; and
   in response to an action by the user that requests to access the application, switching to presenting at least the pre-rendered content to the user in a foreground mode.

2. The method according to claim 1, wherein pre-rendering in the off-line pre-render mode comprises declining network-related requests from the application.

3. The method according to claim 2, wherein declining the network-related requests comprises responding to the network-related requests from the application with a response indicating the network is unavailable.

4. The method according to claim 1, wherein pre-rendering in the off-line pre-render mode comprises rendering at least part of the content from a local cache in the user device.

5. The method according to claim 1, wherein pre-rendering in the off-line pre-render mode comprises notifying the application that pre-rendering is performed in accordance with the off-line pre-render mode.

6. The method according to claim 1, wherein pre-rendering in the off-line pre-render mode comprises pre-rendering a placeholder item in place of an actual content item that requires fetching over the network.

7. The method according to claim 1, wherein pre-rendering in the off-line pre-render mode comprises penalizing the application for requesting to fetch a content item over the network.

8. The method according to claim 1, wherein pre-rendering in the off-line pre-render mode comprises receiving in the application, via an Application Programming Interface (API), an indication that pre-rendering is performed in accordance with the off-line pre-render mode, and in response running program code that pre-renders the content in accordance with the off-line pre-render mode.

9. The method according to claim 1, wherein switching to the foreground mode comprises refreshing at least some of the content over the network.

10. The method according to claim 1, wherein pre-rendering in the off-line pre-render mode is performed in response to an acknowledgement from the application, indicating that the application supports the off-line pre-render mode.

11. The method according to claim 1, wherein preloading the application comprises choosing, based on a criterion, whether to pre-render the content in accordance with the off-line pre-render mode, or in accordance with an on-line pre-render mode in which it is permitted to fetch content over the network to the user device.

12. The method according to claim 11, wherein pre-rendering in the on-line pre-render mode comprises receiving in the application, via an Application Programming Interface (API), an indication that pre-rendering is performed in accordance with the on-line pre-render mode, and in response running program code that pre-renders the content in accordance with the on-line pre-render mode.

13. The method according to claim 11, wherein choosing the on-line pre-render mode is performed in response to an acknowledgement from the application, indicating that the application supports the on-line pre-render mode.

14. The method according to claim 11, wherein the criterion depends on at least one factor selected from:
   a usage pattern of the application;
   a condition of the user device; and
   a condition of the network.

15. A user device, comprising:
   an interface for communicating over a network; and
   a processor, configured to:
      preload an application in a background mode in which content presented by the application is hidden from a user of the user device;
      pre-render at least part of the content presented by the application in an off-line pre-render mode, wherein pre-rendering in the off-line pre-render mode comprises (i) pre-rendering only content that is available locally in the user device and (ii) inhibiting fetching of any content over the network to the user device; and in response to an action by the user that requests to access the application, switch to presenting at least the pre-rendered content to the user in a foreground mode.

16. The user device according to claim 15, wherein, in the off-line pre-render mode, the processor is configured to decline network-related requests from the application.

17. The user device according to claim 16, wherein the processor is configured to decline the network-related requests by responding to the network-related requests from the application with a response indicating the network is unavailable.

18. The user device according to claim 15, wherein, in the off-line pre-render mode, the processor is configured to render at least part of the content from a local cache in the user device.

19. The user device according to claim 15, wherein the processor is configured to notify the application that pre-rendering is performed in accordance with the off-line pre-render mode.

20. The user device according to claim 15, wherein, in the off-line pre-render mode, the processor is configured to pre-render a placeholder item in place of an actual content item that requires fetching over the network.

21. The user device according to claim 15, wherein, in the off-line pre-render mode, the processor is configured to penalize the application for requesting to fetch a content item over the network.

22. The user device according to claim 15, wherein the processor is configured to receive in the application, via an Application Programming Interface (API), an indication that pre-rendering is performed in accordance with the off-line pre-render mode, and in response to run program code that pre-renders the content in accordance with the off-line pre-render mode.

23. The user device according to claim 15, wherein, upon switching to the foreground mode, the processor is configured to refresh at least some of the content over the network.

24. The user device according to claim 15, wherein the processor is configured to pre-rendering the content in the off-line pre-render mode in response to an acknowledgement from the application, indicating that the application supports the off-line pre-render mode.

25. The user device according to claim 15, wherein the processor is configured to choose, based on a criterion, whether to pre-render the content in accordance with the off-line pre-render mode, or in accordance with an on-line pre-render mode in which it is permitted to fetch content over the network to the user device.

26. The user device according to claim 25, wherein the processor is configured to receive in the application, via an Application Programming Interface (API), an indication that pre-rendering is performed in accordance with the on-line pre-render mode, and in response to run program code that pre-renders the content in accordance with the on-line pre-render mode.

27. The user device according to claim 25, wherein the processor is configured to choose the on-line pre-render mode in response to an acknowledgement from the application, indicating that the application supports the on-line pre-render mode.

28. The user device according to claim 25, wherein the criterion depends on at least one factor selected from:
a usage pattern of the application;
a condition of the user device; and
a condition of the network.

* * * * *